US012633016B2

(12) United States Patent
Alsheuski et al.

(10) Patent No.: US 12,633,016 B2
(45) Date of Patent: May 19, 2026

(54) ENHANCED PICTURE-IN-PICTURE

(71) Applicant: JSC Yukon Advanced Optics Worldwide, Vilneus (LT)

(72) Inventors: Aliaksandr Alsheuski, Vilnius (LT); Vladimir Dasiukevich, Glasgow (GB)

(73) Assignee: JSC Yukon Advanced Optics Worldwide, Vilnius (LT)

( * ) Notice: Subject to any disclaimer, the term of this patent is extended or adjusted under 35 U.S.C. 154(b) by 2 days.

(21) Appl. No.: 18/696,913

(22) PCT Filed: Oct. 4, 2021

(86) PCT No.: PCT/EP2021/077322
§ 371 (c)(1),
(2) Date: Mar. 28, 2024

(87) PCT Pub. No.: WO2023/057040
PCT Pub. Date: Apr. 13, 2023

(65) Prior Publication Data
US 2025/0037334 A1     Jan. 30, 2025

(51) Int. Cl.
| | |
|---|---|
| *F41G 1/38* | (2006.01) |
| *F41G 3/16* | (2006.01) |
| *G06T 3/40* | (2006.01) |
| *G06T 11/60* | (2006.01) |

(52) U.S. Cl.
CPC .............. *G06T 11/60* (2013.01); *F41G 1/38* (2013.01); *F41G 3/165* (2013.01); *G06T 3/40* (2013.01)

(58) Field of Classification Search
CPC .............. F41G 1/38; F41G 3/165; G06T 3/40
See application file for complete search history.

(56) References Cited

U.S. PATENT DOCUMENTS

| | | |
|---|---|---|
| 2005/0268521 A1 | 12/2005 | Cox |
| 2010/0026721 A1 | 2/2010 | Park |
| 2012/0097741 A1* | 4/2012 | Karcher .................. F41G 1/473 |
| | | 235/404 |
| 2012/0147246 A1 | 6/2012 | Dent |
| 2016/0381297 A1 | 12/2016 | Alsheuski |
| 2024/0167787 A1* | 5/2024 | Ehrlich .................. F41G 3/165 |
| 2024/0295386 A1* | 9/2024 | Moseman ................. G06T 3/14 |

FOREIGN PATENT DOCUMENTS

WO    WO2016/145122 A1    9/2016

OTHER PUBLICATIONS

EPO as ISA; International Search Report/Written Opinion, Jul. 4, 2022, 20 pgs.

* cited by examiner

*Primary Examiner* — J. Woodrow Eldred
(74) *Attorney, Agent, or Firm* — Fish & Richardson P.C.

(57) ABSTRACT

A wide field-of-view (FOV) image (121) is generated based on obtained optical data for display. A first magnified image (131) from a first region of the wide FOV that includes a center of a reticle (122a) is generated. A display of the first magnified image overlapping a first portion of the wide FOV image is initiated. An indication to adjust the first magnified image is received. A second magnified image (152) from a second region of the wide FOV image that is offset from the center of the reticle is generated. Display of the second magnified image overlapping a second portion of the wide FOV image is initiated.

20 Claims, 7 Drawing Sheets

700

700

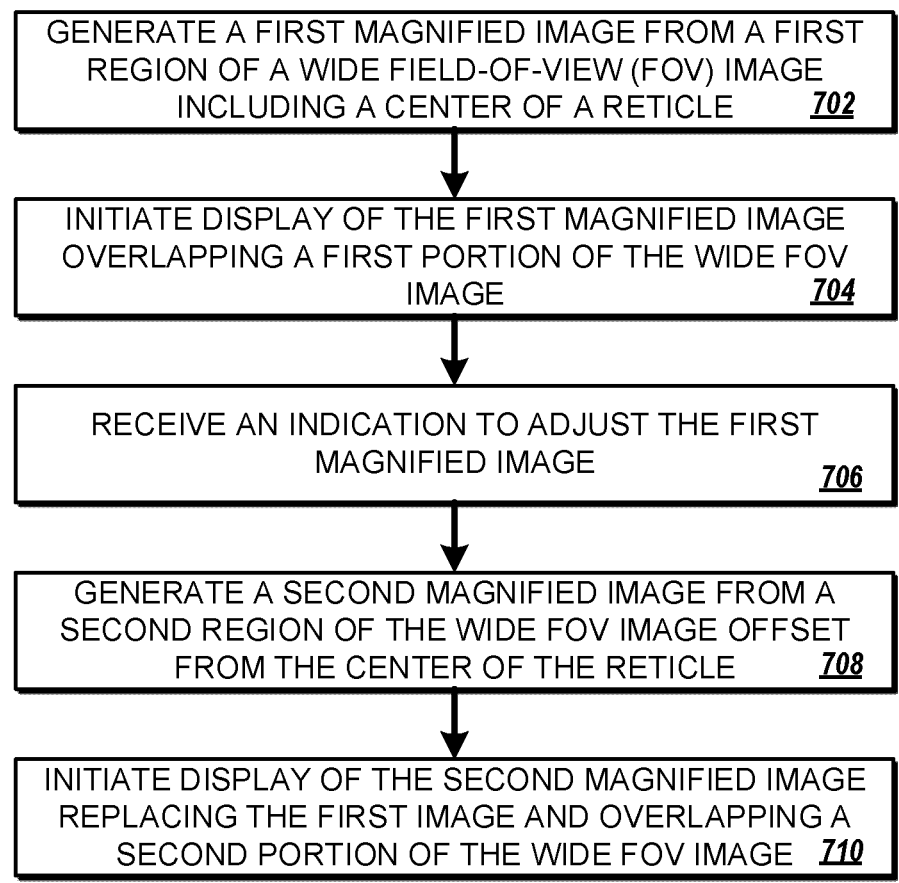

GENERATE A FIRST MAGNIFIED IMAGE FROM A FIRST REGION OF A WIDE FIELD-OF-VIEW (FOV) IMAGE INCLUDING A CENTER OF A RETICLE     _702_

INITIATE DISPLAY OF THE FIRST MAGNIFIED IMAGE OVERLAPPING A FIRST PORTION OF THE WIDE FOV IMAGE     _704_

RECEIVE AN INDICATION TO ADJUST THE FIRST MAGNIFIED IMAGE     _706_

GENERATE A SECOND MAGNIFIED IMAGE FROM A SECOND REGION OF THE WIDE FOV IMAGE OFFSET FROM THE CENTER OF THE RETICLE     _708_

INITIATE DISPLAY OF THE SECOND MAGNIFIED IMAGE REPLACING THE FIRST IMAGE AND OVERLAPPING A SECOND PORTION OF THE WIDE FOV IMAGE     _710_

FIG. 7

ENHANCED PICTURE-IN-PICTURE

BACKGROUND

Currently when using an optical device (e.g., a firearm scope, spotting scope, binocular, telescope, etc.) with a wide field-of-view (FOV) and a reticle (e.g., a crosshair, dot, etc.) for aiming, it can sometimes be extremely difficult to differentiate and/or engage a distant target.

SUMMARY

In some implementations, an optical sensor obtains light from a real-world field of view (FOV). The optical sensor uses the obtained light to generate a digital representation of the FOV. The FOV may include trees, buildings, cars, persons, animals, or any other object within an environment. The digital representation of the FOV may include digital representations of any objects in the FOV. A computing component of a scope may obtain the digital representation of the FOV. The computing component can generate a magnified portion of the digital representation. The computing component may initiate display of the digital representation and the magnified portion of the digital representation. The computing component may provide both the digital representation and the magnified portion of the digital representation to a display device. A user may view the display device.

In some implementations, a computing component obtains additional sensor information. For example, a computing component may obtain sensor data from one or more sensors including at least one of a thermometer, altimeter, hygrometer, barometer, inclinometer, gyroscope, accelerometer, light sensor, and compass. Based on the obtained sensor data, the computing component may determine an estimated point of impact (e.g., an estimated point of impact of a projectile) within a digital representation. The computing component may magnify an area of the digital representation that includes the estimated point of impact. The computing component may enable a user to track a target with localized magnification. The localized magnification may be displayed together with a wide FOV. The localized magnification may include a magnified portion of the wide FOV.

One innovative aspect of the subject matter described in this specification is embodied in a method that includes generating, a first magnified image from a wide field-of-view (FOV) image comprising a reticle indicating a point of aim, where the first magnified image is copied from a first region of the wide FOV image, the first region comprising a center of the reticle; initiating display of the first magnified image within an eye piece of an optical device, the magnified image overlapping a first portion of the wide FOV image within the eye piece; receiving an indication to adjust the first magnified image; generating a second magnified image, where the second magnified image is copied from a second region of the wide FOV image, the second region being offset from the center of the reticle; and initiating display of the second magnified image within the eye piece, the second magnified image replacing the first image and overlapping a second portion of the wide FOV image within the eye piece.

The foregoing and other embodiments can each optionally include one or more of the following features, alone or in combination. For instance, in some implementations, the method further includes determining, based on data from one or more sensors, an estimated point of impact within the wide FOV image, where the estimated point of impact is located within the second region of the wide FOV image.

In some implementations, the method further includes adjusting a location of the reticle to center the reticle on the estimated point of impact within the wide FOV image; and initiating display of the reticle at the location within the eye piece.

In some implementations, the one or more sensors include at least one of a thermometer, altimeter, hygrometer, barometer, inclinometer, gyroscope, accelerometer, light sensor, or compass. In some implementations, the second region of the wide FOV image is centered on the estimated point of impact.

In some implementations, the method further includes initiating display of a graphical indicator within the eye piece, the graphical indicator positioned at the estimated point of impact within the wide FOV image. In some implementations, the indication includes a user input indicating to center the first magnified image on the estimated point of impact. In some implementations, the indication includes a user input defining a direction within the wide FOV image to pan the first magnified image. In some implementations, the second portion of the wide FOV image is the same as the first portion of the wide FOV image. In some implementations, the first portion is above the reticle. In some implementations, the first portion is to one side of the reticle.

Another innovative aspect of the subject matter described in this specification is embodied in a firearm scope that includes a digital display, at least one hardware processor communicably coupled to the digital display, and computer memory interoperably coupled to the at least one hardware processor and storing instructions that, when executed by the at least one hardware processor, cause the at least one hardware processor to perform operations that include generating, from a received image, a wide field-of-view (FOV) image including a reticle indicating a point of aim; initiating display of the wide FOV image on the digital display; generating a first magnified image, where the first magnified image is copied from a first region of the wide FOV image, the first region including a center of the reticle; initiating display of the first magnified image on the display simultaneously with the wide FOV image, the magnified image overlapping a first portion of the wide FOV image; receiving an indication to adjust the first magnified image; generating a second magnified image, where the second magnified image is copied from a second region of the wide FOV image, the second region being offset from the center of the reticle; and initiating display of the second magnified image on the display simultaneously with the wide FOV image, the second magnified image replacing the first image and overlapping a second portion of the wide FOV image.

The foregoing and other embodiments can each optionally include one or more of the following features, alone or in combination. For instance, in some implementations, the operations further include determining, based on data from one or more sensors, an estimated point of impact within the wide FOV image, where the estimated point of impact is located within the second region of the wide FOV image.

In some implementations, the second region of the wide FOV image is centered on the estimated point of impact. In some implementations, the operations further include initiating display of a graphical indicator within the eye piece, the graphical indicator positioned at the estimated point of impact within the wide FOV image.

In some implementations, the indication includes a user input indicating to center the first magnified image on the estimated point of impact. In some implementations, the firearm scope further includes one or more sensors including one or more of a thermometer, altimeter, hygrometer, barometer, inclinometer, gyroscope, accelerometer, light sensor, and compass, and where the operations further include: determining, based on data from the one or more sensors, an estimated point of impact within the wide FOV image, where the estimated point of impact is located within the second region of the wide FOV image.

In some implementations, the indication includes a user input defining a direction within the wide FOV image to pan the first magnified image.

Another innovative aspect of the subject matter described in this specification is embodied in a firearm scope that includes a digital display, at least one hardware processor communicably coupled to the digital display, and computer memory interoperably coupled to the at least one hardware processor and storing instructions that, when executed by the at least one hardware processor, cause the at least one hardware processor to perform operations that include generating, from a received image, a wide field-of-view (FOV) image including a reticle indicating a point of aim and a target in an environment; initiating display of the wide FOV image on the digital display; obtaining sensor input corresponding to conditions of the target and the environment; determining, based on the sensor input, a point of impact; generating a magnified image, where the magnified image is copied from a region of the wide FOV image, the region being offset from the center of the reticle and centered on the determined point of impact; and initiating display of the magnified image on the digital display simultaneously with the wide FOV image, the magnified image overlapping a portion of the wide FOV image.

The foregoing and other embodiments can each optionally include one or more of the following features, alone or in combination. For instance, in some implementations, the operations further include adjusting the magnified image.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented in particular implementations so as to realize one or more of the following advantages. First, providing a magnified PIP within a wide FOV image can enhance situational awareness for a viewer of the image using an optical device. Enhanced situational awareness can improve safety for the optical device user (e.g., law enforcement, military, security, etc.) or help improve the efficacy of the viewing/recording of a particular image (e.g., research, documentation, surveillance, etc.). Second, the magnified PIP image can allow an optical device user to quickly focus the optical device to draw attention to definite features of a particular wide FOV image (e.g., an animal, building, surveillance target, etc.). For example, this can enhance usability, e.g., where there are many features present in an image (e.g., a city or jungle type environment) or ambient light is naturally fading (e.g., at dusk/sunset). In a specific example, with respect to a thermal camera implementation of the magnified PIP, when entering a no-light (or low-light) environment (e.g., a building with no lights, moonless/cloudy night, in woods/jungle, etc.), the magnified PIP can be used to provide a thermal, situational-awareness FOV of an area in front of a user to allow the user to quickly and accurately spot, identify, and number targets and orient a normally degraded functionality daylight-type optical device (e.g., a firearm scope). This increase in reaction time can result in proper and effective target engagement and enhance overall safety for the optical device user. Third, the described functionality can provide greater detail, confidence, and confirmation of the identity of a target when viewing a wide FOV image with an optical device. For example, a reticle associated with a wide FOV image can be used to indicate a particular target on the wide FOV image while the magnified PIP can be used to provide additional detail related to the target (e.g., animal type, facial features, license plate number, number of individuals, etc.). As a particular example, a hunter can confirm that an object seen in the wide FOV image is actually an animal being hunted as opposed to a camouflaged human hunter. Fourth, a thermal implementation for the magnified PIP could also be used to peer through smoke, haze, fog, and/or other obscurants in the air degrading a standard daylight wide FOV image. In another example, different thermal modes could be provided to enhance viewing of the image. For example, the wide FOV image could be displayed in a black hot (or other) representation while the magnified PIP could be displayed in different (e.g., white hot, color, or other) representations. Other advantages will be apparent to those of ordinary skill in the art.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 7 is a flowchart illustrating an example of a process for providing an enhanced PIP view.

Like reference numbers and designations in the various drawings indicate like elements.

DETAILED DESCRIPTION

Currently when using an optical device (e.g., a firearm scope, spotting scope, binocular, telescope, etc.) with a wide field-of-view (FOV) and a reticle (e.g., a crosshair, dot, etc.) for aiming, it can sometimes be extremely difficult to differentiate and/or engage a distant target. However, if the FOV is narrowed and the target is zoomed in on to provide greater target detail, situational awareness can be decreased or lost due to the narrowed FOV. A narrowed FOV can, for example, decrease or prevent an optical device operator from gathering data, fully assessing a tactical situation, and/or performing some desired task. Furthermore, some optical devices permit selective magnification of a portion of a wide FOV, but in such devices, the magnified region is centered on the reticles. Thus, these devices can be difficult to employ in tactical situations that require a holdover to compensate for the deviation of a projectile (e.g., bullet, arrow) path at long range or in non-ideal environmental conditions, because the desired point of aim (POA) with the holdover may be outside of the magnified region.

At a high level, what is described is a system and method for providing enhanced situational awareness using magnified picture-in-picture (PIP) within a wide FOV image from an optical device. While a specific illustration of a particular optical device providing the described functionality is not provided, those of ordinary skill in the art will appreciate that the described system, method, and/or functionality can be applied to optical devices including, but not limited to, firearm scopes, spotting scopes, telescopes, binoculars, monocular, digital cameras, and other optical devices. In some implementations, a specific "add-on"/external system implementation can be used in conjunction with an existing optical device (with appropriate adaptors as understood by those of ordinary skill in the art) to provide the described enhanced situational awareness using magnified PIP within a wide FOV image from the optical device. In other implementations, the described system, method, and/or functionality can be integrated directly into the hardware/software of an optical device.

Figure 1:
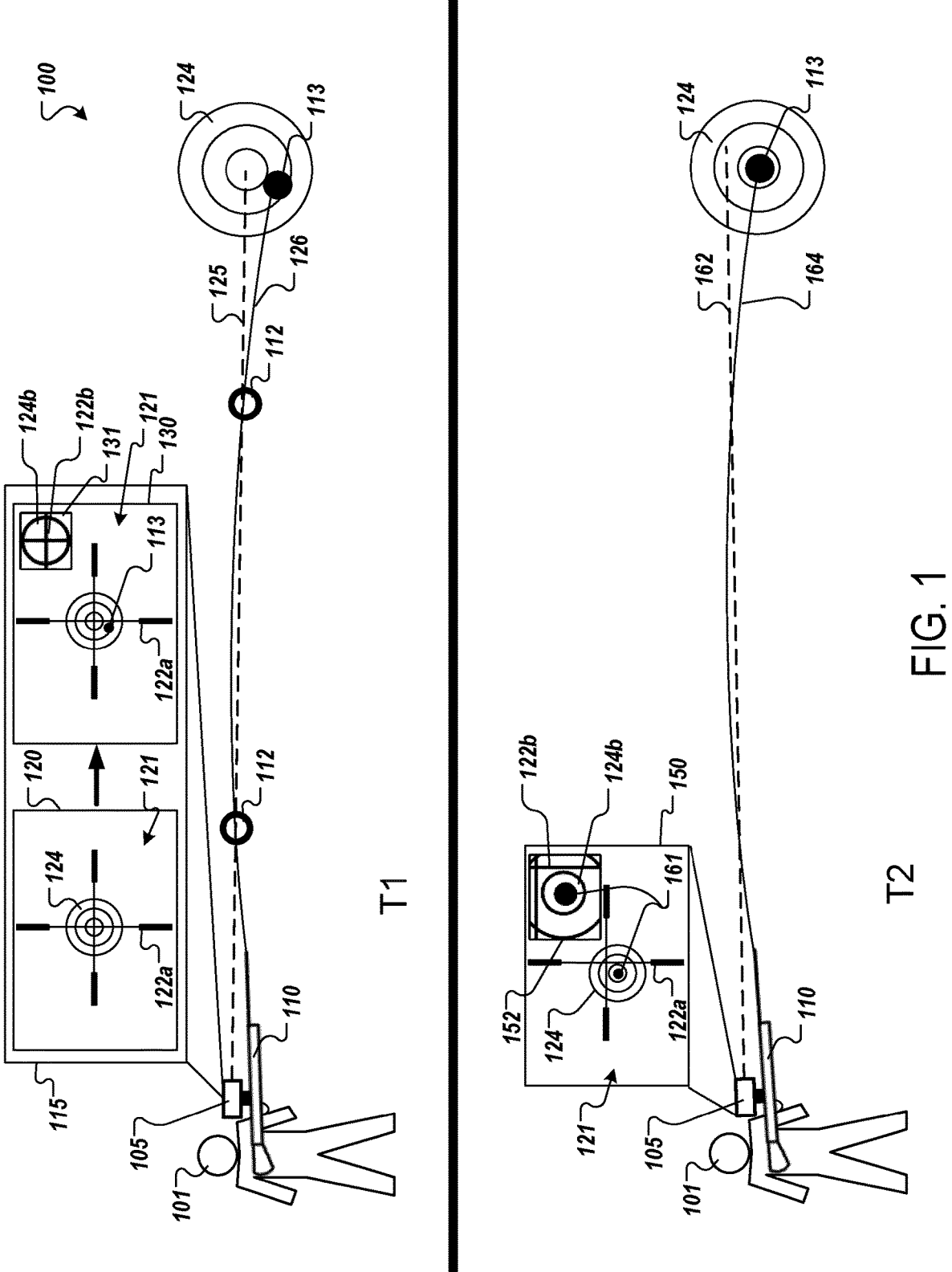
FIG. 1 is a diagram showing an example application of an optical system with an enhanced picture-in-picture (PIP) view.

FIG. 1 is a diagram 100 showing an example application of an optical system with an enhanced picture-in-picture (PIP) view. In the example application shown, the optical system is a scope 105 connected to a firearm 110. However, the features and techniques described herein can also be incorporated into other optical systems including, but not limited to, binoculars, monocular, and surveying scopes. In addition, while the scope 105 is depicted as being mounted to a rifle, similar scopes 105 with features similar to those described herein can be used with other firearms (e.g., pistols and shotguns) or other projectile firing devices (e.g., bows and crossbows).

For example, the scope 105 may include a digital display (e.g., liquid crystal display (LCD), light-emitting diode (LED) display, among others) configured to present images generated by the scope 105. As described in more detail below, the scope may include optical sensors (e.g., charge coupled devices (CCD)) to collect light from the surrounding environment and a processing system to render corresponding images on the display.

For example, the scope 105 may initiate display of views 115 on a digital display within the optics of the scope. The scope displays a wide FOV image 121 as depicted in view 120. View 120 shows an aiming indicator (e.g., reticle 122) and the target 124 within the FOV of the scope 105. Upon receiving user input or automatically upon startup, the scope 105 also displays a magnified PIP view 131, as shown in view 130, over a portion of the wide FOV image 121 (e.g., the upper right corner). The functionality to turn reticles PIP view 131 ON/OFF can be, for example, provided by a user-accessible control (e.g., a multi-function switch, touch screen selection, external application on a mobile computing device, etc.) and/or some other method/control consistent with this application.

For example, both the wide FOV image 121 and the magnified PIP 131 have some type of aiming indicator (e.g., a reticle), 122a and 122b, respectively. In the illustrated views 115, the reticle 108 a/108 b is a similar "+"-shaped crosshair. The reticles 124a, 124b provide a fine aiming point on the target 124 in the wide FOV image 121 and an associated aiming point on the analogous target 124b displayed in a magnified state in the magnified PIP 131. Note that in some implementations the reticles 122a and 122b can be represented as shapes other than a "+" shaped crosshair depicted. For example, reticles 122a, 122b can be represented as a "T"-shaped crosshair, while the magnified PIP 122b reticle could be an "X"-shaped aiming indicator, a simple "red dot"-type aiming indicator, some other type of aiming indicator, varying in color, etc. In some implementations, reticle 122a, 122b, or both can include bullet drop compensation indications along the lower vertical line.

As illustrated, in typical implementations, a central area of a defined size (whether pre- or user-determined) of the wide FOV image 121 around the reticle 122a (whether displayed or not) is copied, processed, and projected as the magnified PIP 131. In typical implementations, the magnified PIP 131 displays a lower pixel detailed image providing an apparent increase in magnification. The magnified PIP 131 can also reflect a reduced size reticle 122b (analogous to reticle 122a) in a proper position onto the image displayed in the magnified PIP 131 for user reference and to provide situational awareness.

Note that in some implementations, the reticle 122a and 122b need not be similar. For example, the wide FOV reticle 122a could be the represented "T"-shaped crosshair, while the magnified PIP reticle 122b could be an "X"-shaped aiming indicator, a simple "red dot"-type aiming indicator, some other type of aiming indicator, varying in color, etc. In some implementations, the wide FOV image 121 and/or magnified PIP view 131 in view 130 can be displayed with the reticle turned OFF to provide an unobstructed view of the associated image. The functionality to turn reticles 122a and/or 122b ON/OFF can be, for example, provided by a user-accessible control (e.g., a multi-function switch, touch screen selection, external application on a mobile computing device, etc.) and/or some other method/control consistent with this application.

In some implementations, the magnification provided by the magnified PIP view 131 can be selectable. For example, the magnified PIP view 131 could provide a magnification (i.e., "zoom") range of 1-4× or some other magnification range. This selection could, in some implementations, be made by a user through a user-accessible control (e.g., a multi-function switch, touch screen selection, external application on a mobile computing device, etc.) and/or some other method/control consistent with this application. In some implementations, both the wide FOV image 121 and the magnified PIP 131 can be zoomed. In these implementations, changing the zoom of one can affect the zoom of the other. For example, if the wide FOV image 121 is at a 1.0× (actual size) and the magnified PIP 131 is as 2.5×, if the wide FOV image 121 is zoomed to 2.0×, the magnified PIP 131 zoom value may change to a higher value (e.g. 4.0×) according to some determined dynamic scale or a prior/on-the-fly user selection. The same can also occur if a zoom value is reduced for either the wide FOV image 121 or the magnified PIP 131.

In some implementations, the scope 105 obtains data from a user interface to configure a view. For example, as discussed in reference to FIG. 3, the scope may allow a user 101 to adjust the PIP view 131 within the display. In the example of FIG. 1, the user 101 may interact with a user-accessible control (e.g., a multi-function switch, touch screen selection, external application on a mobile computing device, etc.) to adjust the PIP view 131 within a display view 130. For example, scope 105 can permit the user to adjust the size, shape, or location of the PIP view 131.

Whether or not a reticle is displayed can be regulated by laws, regulations, etc. In some implementations, the wide FOV image 121 and/or magnified PIP 131 can be devoid of a reticle or types of reticles in order to be in compliance with laws and/or regulations. In implementations with a reticle, reticle types/patterns can be pre-programmed and/or uploaded into a memory for use through a data, network, and/or other type of connection. Reticles can also be aligned ("zeroed") with a reticle on an optical scope or other optical device to allow for even greater versatility (e.g., using an adjustment method such as the above-described multi-function switch, touch screen, external application, etc.) to move the displayed reticle.

In some implementations, for example, infrared thermal applications, a thermal display frame rate for the wide FOV image 121 and/or magnified PIP view 131 can also be restricted. For example, an 8 Hz refresh rate may be exportable to different countries, but a 9 Hz+ refresh rate may not. Note that the exportability, legality, etc. may also be influenced by the use of the above-mentioned reticle types in combination with varied refresh rates.

In some implementations, the digital display may include translucent or transparent materials (e.g., glass, plastic, among others). For example, the digital display can be implemented as a holographic display that projects within the optics of an analog optical scope. For example, the scope 105 may magnify light obtained from a scene directly to the user 101 through one or more lenses. The scope 105 may generate the PIP views by controlling optical sensors and a processor to enlarge a portion of the light obtained from the scene and provide the enlarged portion of the scene as a holographic display overlapping with the primary FOV of the scope 105.

In some implementations, the scope 105 may obtain environmental sensor data and generate data for display based the obtained environmental sensor data. Such environmental data can include, but is not limited to, range to the target, wind, incline, barometric pressure, air temperature, elevation, etc. The environmental sensor data can be obtained by additional sensors one or in communication with the scope 105. Such sensors can include, but are not limited to, thermometer, altimeter, hygrometer, barometer, inclinometer, gyroscope, accelerometer, light sensor, or compass. As explained in more detail below, the scope 105 can use the environmental sensor data to calculate an estimated point of impact for a projectile.

FIG. 1 depicts a user 101 aiming the firearm 110 at target 124 through the scope 105. FIG. 1 shows user 101 aiming two different times: time T1 and at time T2. At time T1, the user 101 aims the firearm 110 to a point of aim (POA) 125 which coincides with the center of the reticles 122a, 122b. At a later time T2, the user 101 adjusts to a new POA 162 that accounts for holdover to account for the drop of the projectile and effects of wind along the projectile path 164 to the target 124.

More specifically, at time T1, the user 101 aims the firearm 110 with the scope 105 at the target 124. The scope 105 generates views 115. The scope 105 generates a first view 120 depicting the target 124 in a wide FOV image 121. In response to user input to present a PIP view, the scope 105 generates a second view 130 that includes a PIP view 131 overlaid on the wide FOV image 121. The PIP view 131 is a magnified version of the wide FOV image 121 centered on the reticle 122a. At time T1, the scope 105 indicates a POA 125 directed at the center of the target 124. The POA 125 corresponds to the position and orientation of the scope 105 with respect to the target 124. The POA 125 generally matches the location indicated by the reticle 122a, 122b, as shown in views 120 and 130.

In some implementations, the scope 105 presents a graphical indication of an estimated point of impact (POI) 113 within the view 130. The POI 113 can be selected through user input to the scope 105 or calculated automatically, without user input, by the scope 105 (e.g., from environmental sensor data). In other cases, the scope 105 can simply enlarge the center portion of the reticle 122 without estimating a POI 113.

The POI 113 may depend on many factors including environmental factors (e.g., range, wind, precipitation, humidity, or other weather phenomena), characteristics of the firearm 110, characteristics of a projectile, and distance to the target 124. As shown in FIG. 1, depending on the range from the user 101 to the target 124, the POI 113 may be more or less consistent with the POA 125. Intermediate points 112 show the initial and terminal zero points where the POA 125 (line of sight) intersects the estimated projectile path 126. As illustrated in the diagram for time T1, in some circumstances the POI 113 may fall outside of the PIP view 131. These situations create challenges for a user 101 when employing the PIP function of the scope 105 because the user's situational awareness is degraded when the POI 113 falls outside the PIP view 131.

At time T2, the user 101 adjusts the POA 125 to POA 162 to account for holdover. In response to the movement of the firearm 110, the view inside the scope 105 shifts as shown in view 150. Like view 130, view 150 includes a wide FOV image 121 and a PIP view 152. Note, the target 124 is shifted within the FOV due to a change in POA from POA 125 to POA 162. To compensate for this shift, when adjusting a POA for holdover, the scope 105 allows for the PIP view to be panned to magnify a different region of the wide FOV image 121 as illustrated by PIP view 152.

The scope 105 can be controlled to adjust the PIP view 152 manually or automatically. For example, the scope 105 can include a manual user-accessible control (e.g., a multi-function switch, touch screen selection, external application on a mobile computing device, etc.) and/or some other method/control consistent with this application. The manual adjustment can permit the user to pan or scroll the view displayed in the PIP view in increments. For example, upon receiving manual input that adjusts the PIP view 152, the scope 105 can shift a region of the wide FOV image 121 down and to the left (e.g., as shown in FIG. 1) in order to magnify a region of the wide FOV image 121 that is offset from the center of the reticle 122a, but which encompasses the estimated POI 113 on the magnified target 124b shown in the PIP view 152. In some implementations, the scope 105 automatically re-centers the PIP view 152 on the estimated POI 113. For example, in implementations where the scope 105 can perform a POI calculation, the scope 105 can automatically re-center the PIP view 152 on a region of the wide FOV inmate 121 that includes a graphical POI indicator. The scope 105 can immediately re-center the PIP view 152 following such calculations or request a user input to confirm re-centering the PIP before doing so.

In some implementations, the scope 105 obtains user input data through a user interface to compute a POI 113. This data could, in some implementations, be made by a user through a user-accessible control (e.g., a multi-function switch, touch screen selection, external application on a mobile computing device, etc.) and/or some other method/control consistent with this application. For example, the scope 105 can receive a manual input in which the user inputs information including, but not limited to, estimated wind speed, wind angle, range, firearm characteristics (e.g., barrel length, sight height, zero range), and bullet characteristics (e.g., caliber, initial velocity, ballistic coefficient). In such implementations, the scope 105 can execute a ballistic trajectory calculator stored in computer memory of the scope 105 to estimate the POI 113 from the user input.

In some implementations, the scope 105 performs operations without input from a user interface. For example, the scope 105 may be configured to estimate the POI 113 without receiving a user request for a POI estimate. Furthermore, the scope 115 may be configured to generate a view, or image, that includes the POI 113 for display. Similarly, the scope 105 may generate the PIP view 131 without a request from a user.

In some implementations, the scope 105 determines an estimated POI 113 using environmental sensor data. The scope 105 may obtain data from one or more environmental sensors attached to or in communication with the scope 105. The one or more sensors may include a thermometer, altimeter, hygrometer, barometer, inclinometer, gyroscope, accelerometer, light sensor, or compass, depending on implementation. The scope 105 can determine a path 126 from the location of the user 101 to the target 124 by, e.g., applying the sensor data as input to a ballistics trajectory calculator stored in memory on the scope 105. In some implementations, the sensor data augments user input data for performing basic calculations. For instance, a user may still be required to input ballistic calculation data that cannot be obtained by sensors, such as firearm characteristics and bullet characteristics.

For example, the scope 105 may obtain ranging data (e.g., Light Detection and Ranging (LIDAR), among others) and determine a distance to the target 124. The scope 105 may further obtain data from one or more sensors to determine wind, air pressure, earth rotation, or other effects on a projectile. The scope 105 can determine the estimated POI 131 by applying such sensor data into the ballistic trajectory calculator.

As discussed herein, the scope 105 may generate an estimated POI 131 indicating where a projectile loosed from the firearm 110 would hit. The scope 105 generates a view 150 that includes a graphical representation of the estimated POI 131 and a PIP view 152 centered on the estimated POI 131. By centering the PIP view 152 on the estimated POI 131 as opposed to on the reticle 122, the user 101 may more effectively determine if the POA 162 is correct or if further adjustments to the aim are required. By including the PIP view 152 with the wide FOV image 121 in view 150, the scope 105 provides both a context for the area surrounding the target 124 and fine details as to the precise targeting as indicated by the estimated path 164 and POI 131 of a bullet. This allows the user 101 to maintain situational awareness while enabling precision aiming in relation to the target 124.

Figure 2:
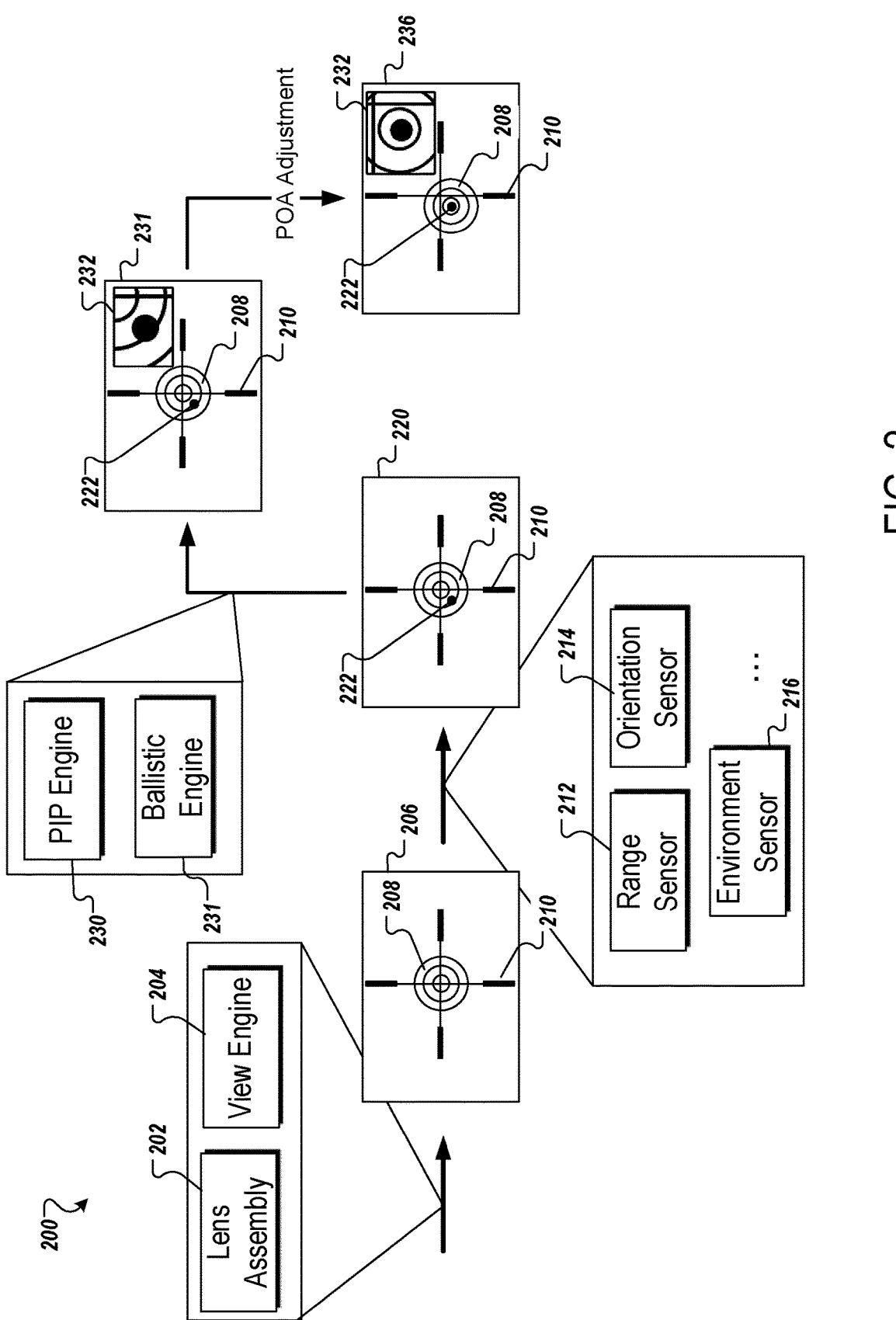
FIG. 2 is a diagram of a system for providing an enhanced PIP view.

FIG. 2 is a diagram of an optical system 200 for providing an enhanced picture-in-picture view. The system 200 includes a lens assembly 202, a view engine 204, one or more sensors, and a PIP engine 230. The one or more sensors include, but are not limited to, a range sensor 212, an orientation sensor 214, and an environment sensor 216.

In some implementations, components of the system 100 include the system 200. For example, the scope 105 of the system 100 may perform operations described as performed in the system 200. The scope 105 may include one or more processing elements that perform operations discussed above and in reference to the system 200 of FIG. 2.

The lens assembly 202 of the system 200 directs light captured from a scene. The lens assembly 202 can include one or more lenses or mirrors. The lens assembly 202 capture light that is emitted from, or is reflected off, a target at a location in an environment. The lens assembly 202 may direct the light towards an image sensor (e.g., an array of CCD sensors) or to a viewing device, such as an eyepiece. The view engine 204 generates a view based on the light directed by the lens assembly 202. The view engine 204 may include, or be communicably connected to, an eyepiece or other viewing device for a user, such as the user 101 to view the captured light or a representation of the captured light.

In some implementations, the view engine 204 can be implemented in software or hardware. For example, the view engine 204 can be implemented as a software application executed by a processor in scope 105 or as hardware circuitry separate from a general processor, e.g., as a graphics or specialized image processor. For example, as discussed in reference to FIG. 5, the lens assembly 202 may direct light to an array of image sensors of the view engine 204. The image sensor of the view engine 204 can process the light to generate a digital representation of the light received through the lens assembly 202. The view engine 204 may then provide the digital representation to a display device (e.g., LCD, LED display, among others) mounted within the scope 105 and visible through the eyepiece.

In the example of FIG. 2, the view engine 204 generates view 206 based on the light obtained and directed by the lens assembly 202. In this example, the view 206 includes a wide FOV image of a target 208. In addition, as discussed in reference to FIG. 1, the view engine 204 can overlay a reticle 210 on the image generated in view 206 to indicate a current POA.

The system 200 can obtain ballistic calculation data from one or more sensors. The one or more sensors can include the range sensor 212, the orientation sensor 214, and the environment sensor 216. In some implementations, system 100 can have one or more other sensors including, but not limited to, a thermometer, altimeter, hygrometer, barometer, inclinometer, gyroscope, accelerometer, light sensor, or compass.

As similarly described in reference to FIG. 1 and the scope 105, the system 200 may obtain a distance measurement from the range sensor 212, an orientation from the orientation sensor 214, and environmental data from the environment sensor 216. The distance measurement may include a distance to the target 208 from a position of a firearm, such as the firearm 110 of FIG. 1, associated with the system 200. The orientation may include an orientation of the firearm associated with the system 200 that is aiming at the target 208. The orientation may include an angle of elevation of the firearm. The environmental data may include wind, temperature, humidity, precipitation, among others.

The system 200 can determine an estimated POI 222 based on the data from the one or more sensors. For example, the system 200 can include a ballistic engine 231. The ballistic engine 231 can execute a ballistic trajectory calculator to determine an estimated POI 222. The ballistic engine 231 can receive data from the one or more sensors as input for ballistic trajectory calculations to estimate a POI 222. The system 200 can generate and overlay a graphical indication of the estimated POI 222 within the wide FOV image as shown in view 220.

For example, the view engine 204 generates the view 220 to include a representation of the estimated POI 222 overlaid on the wide FOV image. Similar to the reticle 210, the POI 222 may be displayed over a wide FOV image captured by
the lens assembly 202. For example, the view engine 204
may generate a representation of the estimated POI 222 and
include the representation of the estimated POI 222 in the
view 220 such that it occludes a portion of the wide FOV
image depicted in the view 220. This way, the estimated POI
222 may be clearly visible to a user observing the view 220
through the scope 105.

The PIP engine 230 generates a magnified view from a
portion of the wide FOV image displayed by system 200.
For example, the PIP engine 230 obtains data corresponding
to a region of the wide FOV image shown in view 220. The
PIP engine 230 can obtain data corresponding to the POI
222. Data corresponding to the POI 222 can include a
location of the POI 222 within the wide FOV image depicted
in the view 220. For example, the PIP engine 230 can select
a group of pixels from a desired region of the wide FOV
image surrounding the POI 222. The PIP engine 230 can
generate a PIP 232 from the selected group of pixels by
expanding the pixels to generate a magnified view of a
region from the wide FOV image encompassed by the
pixels. The magnified portion of the view 220 includes the
POI 222 and elements of the wide FOV image depicted in
the view 220, such as the target 208 and portions of the
reticle 210. The PIP 232 may be refreshed periodically to
maintain a current magnified view of the POI 222 within the
FOV. The PIP 232 may be centered on the POI 222. By
centering the PIP 232 on the POI 222, the system 200 may
maximize contextual awareness within the magnified view
of the PIP 232.

The PIP engine 230 sends the PIP 232 to the view engine
204. The view engine 204 obtains the PIP 232 and generates
view 231. The view 231 includes a magnified portion of a
FOV as the PIP 232 overlaid on a region of the wide FOV
image.

The user may adjust a POA based on the view 231 and PIP
232 such that an estimated POI aligns with a desired
targeting position, e.g., such as a center of the target 208 (as
shown in view 236). The view engine 204 may continuously
generate views based on obtained light. In some implemen-
tations, the system 200 can continuously estimate POIs
based on changing sensor data. The system 200 may esti-
mate a POI after detecting change in sensor data or obtaining
an input from a user.

In some implementations, movement of the POI is seam-
less as the POA is adjusted. For example, a graphical
representation of a POI may be intermittently updated by the
system 200. In some cases, a target or user is moving and the
system 200 updates a POI intermittently based on changes in
distance to the target or other sensor data changes. The
system 200 can instigate changes based on a change in
sensor data satisfying a threshold or a determined amount of
elapsed time since a previous POI estimation or update.

The system 200 can store the difference between a first
estimated POI and a first POA at a point in time. If the POA
is adjusted to a second POA, the system 200 can update the
graphical representation of the first estimated POI by trans-
lating the difference between the first estimated POI and the
first POA to the second POA. For example, if the first POA
is at a position (POA_X1, POA_Y1) within a FOV, the first
POI is at a position (POI_X1, POI_Y1), and the second POA
is at a position (POA_X2, POA_Y2), then the location of the
graphical indication of the POI can be updated to
(POA_X2+diff(POA_X1, POI_X1), POA_Y2+diff
(POA_Y1, POI_Y1)) where 'diff' represents a difference
function.

Figure 3:
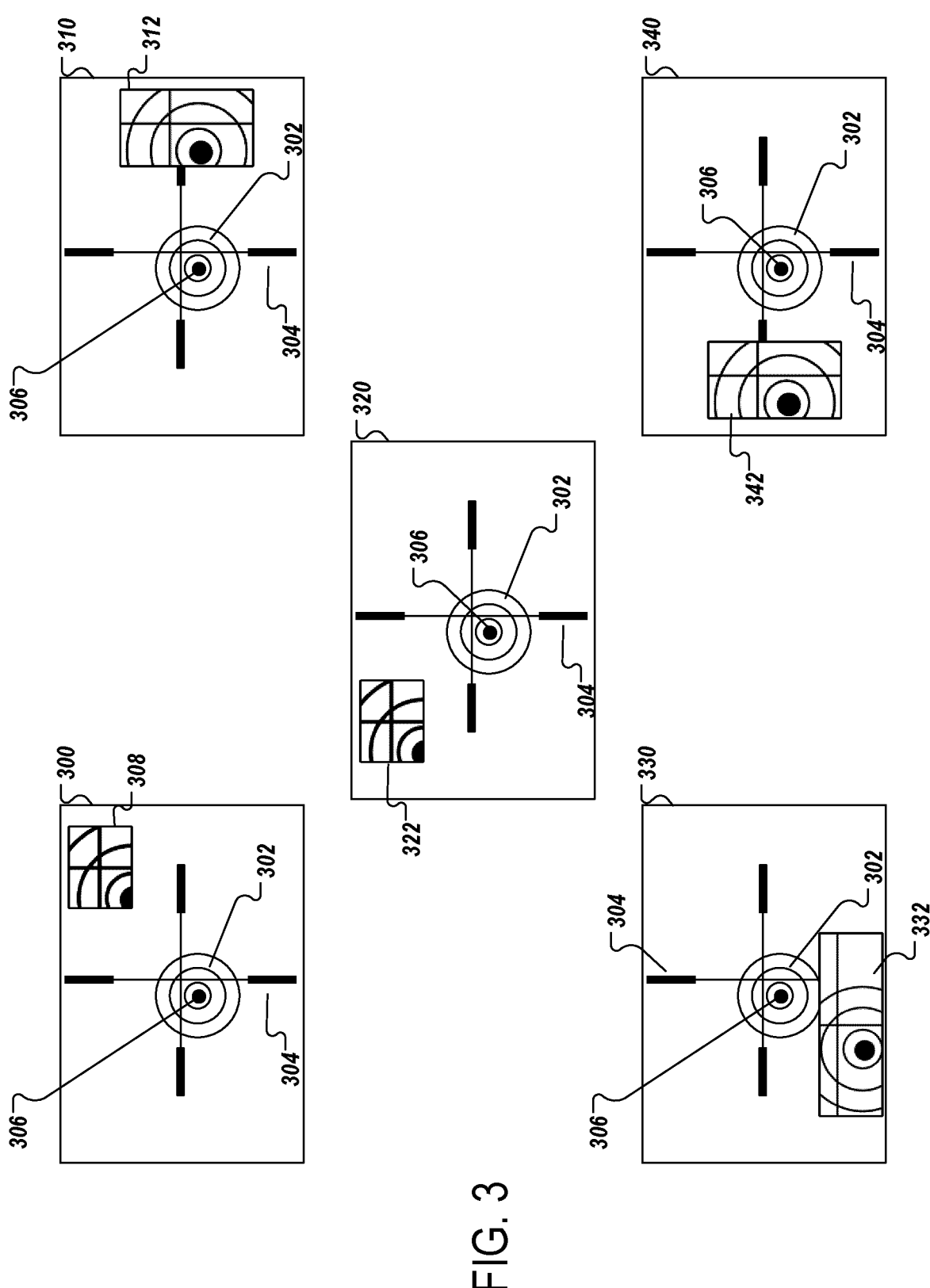
FIG. 3 includes examples of PIP arrangements within views.

FIG. 3 includes examples of picture-in-picture arrange-
ments within views. FIG. 3 includes views 300, 310, 320,
330, and 340. The views 300, 310, 320, 330, and 340 each
include a representation of target 302, a representation of a
reticle 304, and a representation of an estimated POI 306.
The views 300, 310, 320, 330, and 340 each also include a
PIP view, e.g., PIPs 308, 312, 322, 332, and 342. The PIP in
each view is positioned or sized differently. Either through
user control or an automatic process, the system 200, may
position the PIP at an advantageous location within the wide
FOV image depicted in the view. For example, the position
of the PIP within a given view can be adjusted or selected
so as not to occlude the POI within the wide FOV image
either automatically or through user input.

For example, the system 200 can include an input control
that permits a user to adjust the location, size, or shape of the
PIP within a view. Based on the input data, the system 200
can move, resize, or reshape the PIP within a given view. In
another example, the system 200 may recognize features of
a view and automatically position a PIP in an area of a wide
FOV that includes fewer features. For example, the system
200 can position the PIP within a region of the wide FOV
image that does not overlap with a location of a POI
indicator within the wide FOV image.

In the view 300, the PIP 308 is positioned in the top right
of the view 300. The PIP 308, as well as PIPs 322, 332, and
342, may be positioned with view engine components of a
system, such as the view engine 204 of the system 200
shown in FIG. 2. Positioning the PIPs may include deter-
mining pixel values and positions of the PIP relative to a
number of pixel values and locations indicating a current
FOV. The pixels used to indicate the PIPs may replace the
pixels indicating a portion of the FOV. In this way, a PIP may
be seen by a user as overlaying a portion of the FOV.

In the view 310, the PIP 312 is resized and positioned
more vertically and to one side of the FOV. More vertically
proportioned PIPs may be ideal for more vertical targets. In
some implementations, a system, such as the system 200,
detects features within a FOV. For example, the system can
detect a size or shape of a feature within a field of view.
Based on a POA location, POI location, or location manually
selected by a user, the system can select a feature that
includes the location specified by POA, POI, or manual
selection. Based on a size and shape of the feature, the
system can position or resize a PIP. For example, if a user
adjusts a POA such that the POA is pointed at a tree, the
system 200 can determine the feature corresponding to the
location of the POA as a tree and determine that a more
vertically shaped PIP, or a PIP that is able to fit the entire
feature, be generated or positioned and resized within a
corresponding view.

In the view 320, the PIP 322 is positioned to one side of
the FOV depicted in the view 320. In the view 330, the PIP
332 is positioned at a lower position overtop the FOV
depicted in the view 330. Similar to the PIP 312, a system,
such as the system 200, may detect feature shapes and sizes.
Based on the detected feature shapes and sizes, the system
may generate or position and resize a PIP to fit the detected
features if present within the PIP. The system may also, as
mentioned, choose a position, such as a more horizontal
position, if a more horizontal position would occlude fewer
features present in a view or if a user has sent a request for
a more horizontally proportioned PIP. In the view 340,
similar to the view 310, the PIP 342 is positioned more
vertically and to one side of the FOV.

Although FIG. 3 shows PIP views and views as rectan-
gular, any shape can be used. For example, instead of a rectangular magnified portion, a PIP view can include an ovular magnified portion. In addition, a combination of lines and curves can be used to outline any type of shape which may be magnified from a portion of a wide FOV and included in a PIP view. In another example, a view may include an ovular portion of a wide FOV. This may be useful for displays or eye pieces that are ovular. In general, any shape of view or PIP view can be generated to show a portion of a scene that is captured by obtaining radiation (e.g., light radiation in the visible wavelength range, infrared, among others).

Figure 4:
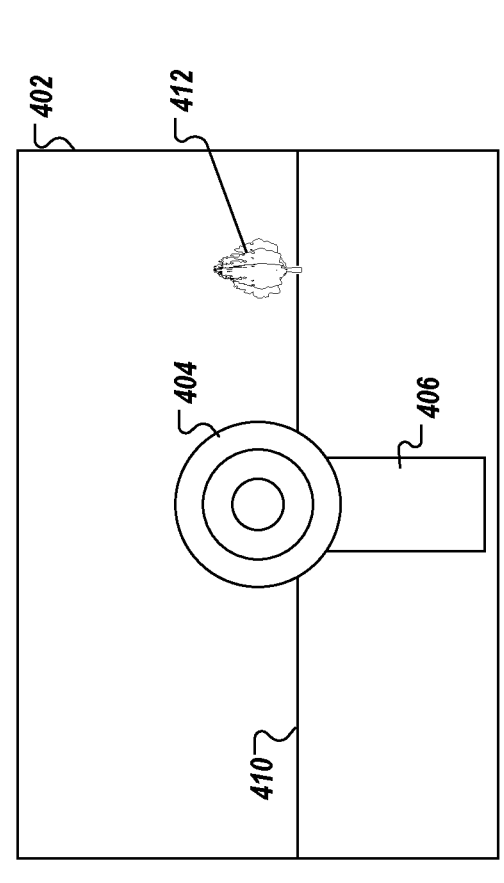
FIG. 4 is a diagram showing cross-hair adjustment with enhanced picture-in-picture.
Figure 4:
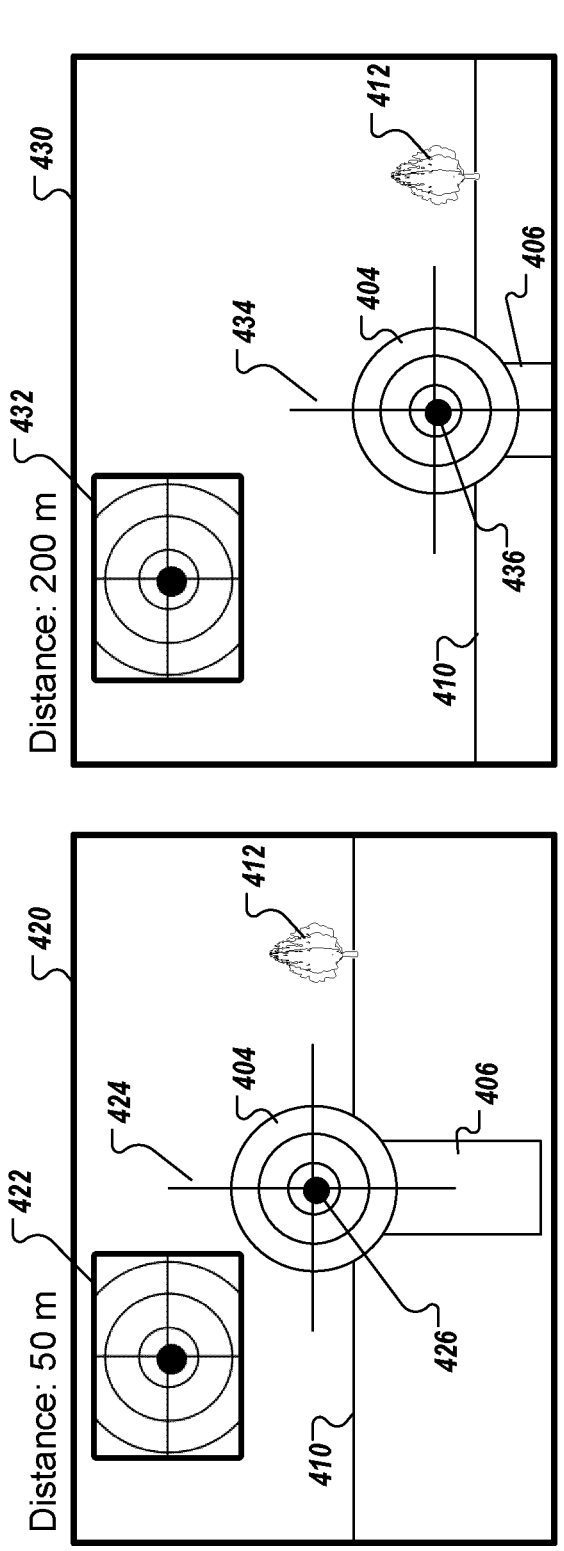

FIG. 4 is a diagram showing cross-hair adjustment with enhanced picture-in-picture. FIG. 4 includes an image 402 showing elements of a scene. The scene includes a target 404 positioned on a stand 406, a horizon 410, and a tree 412. Views 420 and 430 are display representations generated by a system, such as the system 200, to depict features of the scene shown in the image 402. As discussed in reference to FIG. 2, the system 200 can obtain light emitted or reflected off features in the scene and use the obtained light to generate a view for display. The system 200 may add representations of reticles or other aiming assistance to help a user aim at a particular feature within the scene.

The view 420 represents a view of the target 404 at a distance of 50 m with a firearm angled at 0 degrees relative to horizontal. The view 430 represents a view of the target 404 at a distance of 200 m with the firearm angled at 5 degrees relative to horizontal. In general, any change of angle may be used. In this example, a system, such as the system 200, generates an indication of a reticle 424 and an indication of a reticle 434 at different positions based on the distance to the target and accounting for, the change in angle.

As discussed herein, the system 200 may generate a PIP centered not only on a reticle representing a POA, but also on an estimated POI thereby enabling a user to precisely adjust the POA such that the POI is positioned correctly on a target. In FIG. 4, PIPs 422 and 432 are both centered on POIs 426 and 436, respectively. As opposed to previously discussed views, the view 430 shows the reticle 434 lowered with respect to the POA and FOV to account for the POI 436 determined based on the angle, distance of 200 m, and other data obtained by sensors as discussed herein.

The change in position of the horizon 410 from the view 420 to the view 430 shows the change in POA for a firearm being aimed in the example of FIG. 4. The firearm, in order to account for the drop of a loosed projectile, is angled at a steeper angle relative to horizontal. Instead of using another representation, such as a dot, to indicate the position of a POI, a system may adjust the location of a reticle. In some cases, the reticle may be adjusted instead of including an additional representation. In other cases, the reticle may be shown together with a dedicated representation indicating that the reticle is aligned with a POI instead of a POA.

Figure 5:
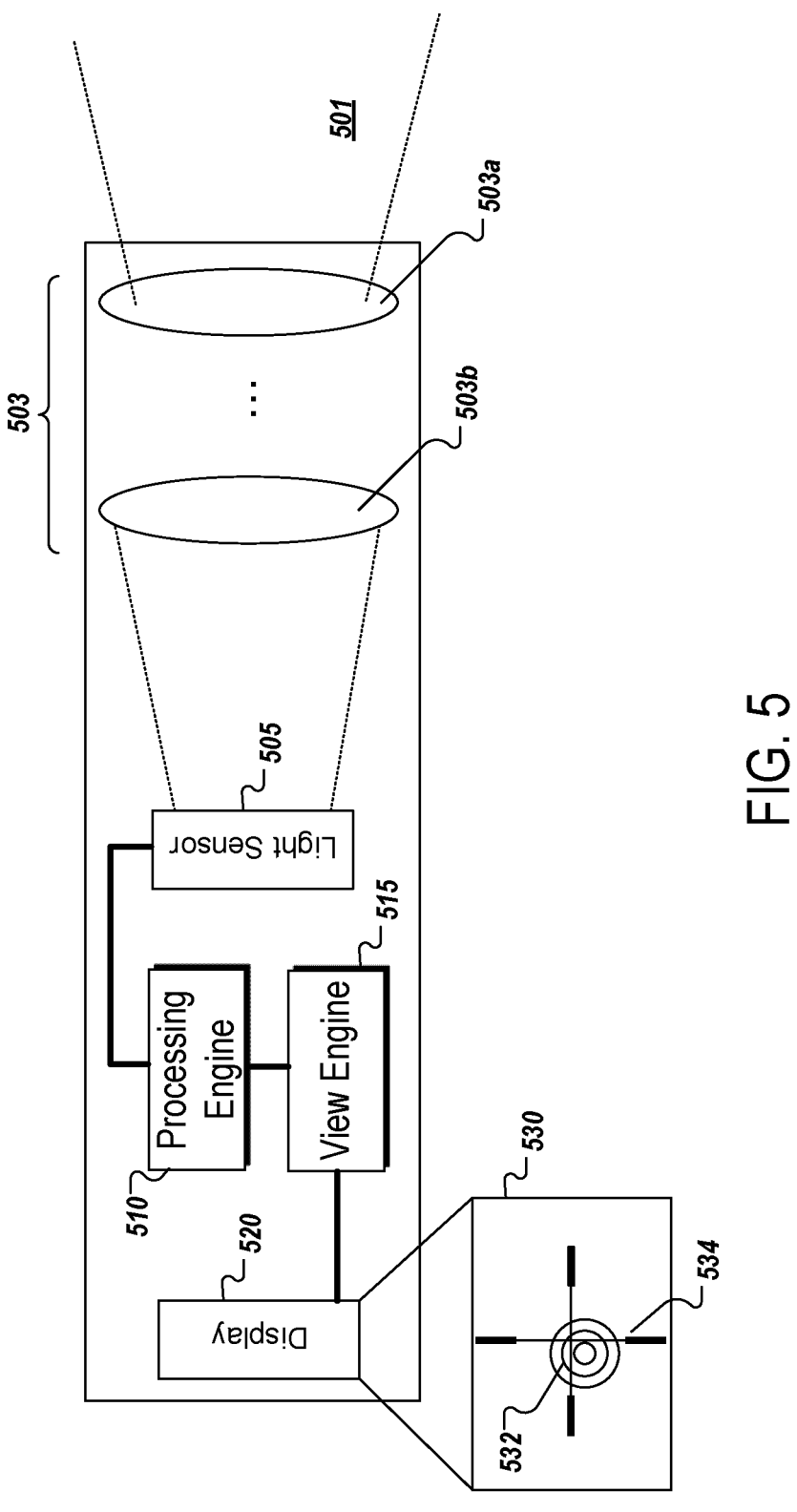
FIG. 5 is a diagram of a device for providing an enhanced picture-in-picture view.

FIG. 5 is a block diagram of a device 500 for providing an enhanced picture-in-picture view such as scope 105 of FIG. 1. The device 500 may be attached to a firearm to aid in aiming and generating views for display to be viewed by a user of the firearm. Operations described in reference to the system 200 of FIG. 2 may be attributed to components of the device 500 of FIG. 5. Similarly, operations described in reference to the device 500 may be attributed to components of the system 200 of FIG. 2.

The device 500 includes a lens assembly 503, a light sensor 505, a processing engine 510, a view engine 515, and a display 520. Light 501 is obtained by the lens assembly 503. The light 501 may include any form of electromagnetic radiation. The lens assembly 503 includes one or more lenses and mirrors. In the example of FIG. 5, the lens assembly 503 includes lens 503a-b. In general, any number of lenses or mirrors may be used to direct the light 501. The device 500 includes a digital imaging device where the light 501 is transformed into a digital signal or voltage by the light sensor 505. For example, light sensor 505 can be implemented as charge coupled devices (CCD) formed from an array of light sensors.

The lens assembly 503 directs the light 501 onto the light sensor 505. The light sensor 505 obtains the light 501 and converts the light 501 into a digital signals or to voltages. The light sensor 505 may include an analog to digital converter (ADC). The light sensor 505 may include a number of pixels which detect components of the light 501. Based on the detection of light registered by the number of pixels of the light sensor 505, the light sensor 505 can generate a digital or voltage that is processed by the processing engine 510.

The processing engine 510 obtains data from the light sensor 505. The data may include voltage or a digital signal depending on the type of sensor used for the light sensor 505 (e.g., CCD sensors (Charged Couple Device), CMOS sensors (Complementary Metal-Oxide Semiconductor), among others). The light sensor 505 and the processing engine 510 work together to convert the light 501 into a digital signal for the view engine 515.

The view engine 515 obtains the digital signal from the processing engine 510. The view engine 515 converts the digital signal to a graphical representation of visual features that indicate features present in a scene from which the light 501 was captured. The view engine 515 may also, as discussed in reference to FIG. 2 and the view engine 204, include additional elements into a view to assist a user in aiming.

The view engine 515 transmits the graphical representation to the display 520. The display 520 may include any form of applicable display device including a LED or LCD display. A graphical representation within additional aiming assistance features generated by the view engine 515 and displayed on the display 520 may be shown as view 530. The view engine 515 generates the representation of target 532 based on the light 501 obtained. The view engine 515 generates representations of reticle 534 based on internal processes as discussed herein.

In some implementations, the device 500 includes a PIP engine, similar to PIP engine 230. For example, the device 500 may generate a view that combines the view 530 as described with a PIP that magnifies a portion of the FOV shown in the view 530. The PIP engine may transmit data to and from the view engine 515 to generate the PIP. The view engine 515 may transmit data to and from the PIP engine to generate a combined view with the PIP overlaying a portion of the FOV shown in the view 530 as a view for display.

Figure 6:
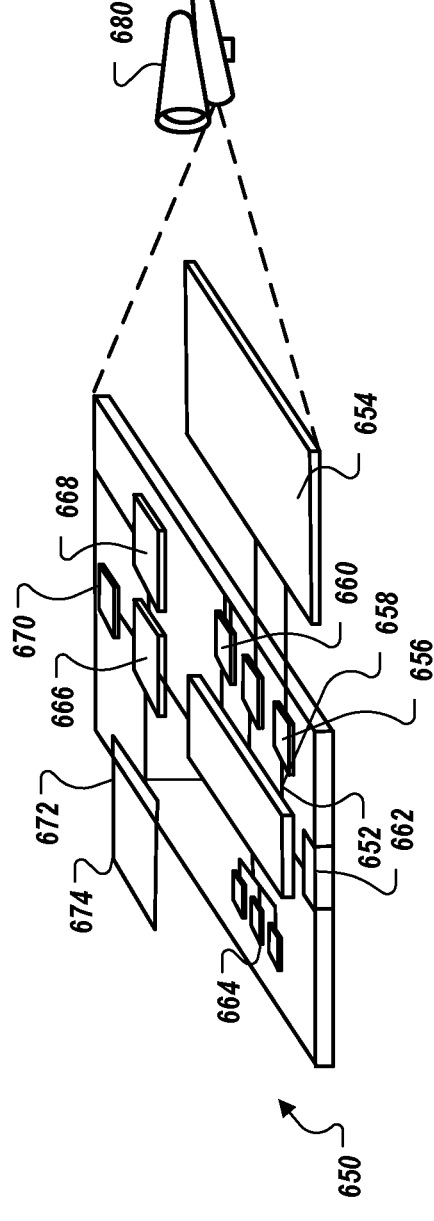
FIG. 6 is a diagram illustrating an example of a computing system used for providing an enhanced PIP view.

FIG. 6 is a diagram illustrating an example of a computing system 650 used for providing an enhanced picture-in-picture view. The computing system 650 may be used to implement the techniques described herein. For example, one or more components of the system 100, the system 200, or the device 500 could be an example of the computing device 650, such as a computer system processing and generating views and PIP views for display.

The computing device 650 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only, and are not meant to be limiting.

The computing device 650 includes a processor 652, a memory 664, an input/output device such as a display 654, a communication interface 666, and a transceiver 668, among other components. The computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the computing device 650, including instructions stored in the memory 664. The processor 652 may be implemented as a chipset of chips that include separate and multiple analog and digital processors. The processor 652 may provide, for example, for coordination of the other components of the computing device 650, such as control of user interfaces, applications run by the computing device 650, and wireless communication by the computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may include appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the computing device 650 with other devices. The external interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. An expansion memory 674 may also be provided and connected to the computing device 650 through an expansion interface 672, which may include, for example, a SIMM (Single In Line Memory Module) card interface. The expansion memory 674 may provide extra storage space for the computing device 650, or may also store applications or other information for the computing device 650. Specifically, the expansion memory 674 may include instructions to carry out or supplement the processes described above, and may include secure information also. Thus, for example, the expansion memory 674 may be provide as a security module for the computing device 650, and may be programmed with instructions that permit secure use of the computing device 650. In addition, secure applications may be provided via the SIMM cards, along with additional information, such as placing identifying information on the SIMM card in a non-hackable manner.

The memory may include, for example, flash memory and/or NVRAM memory (nonvolatile random access memory), as discussed below. In some implementations, instructions are stored in an information carrier such that the instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The computing device 650 may communicate wirelessly through the communication interface 666, which may include digital signal processing circuitry in some cases. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 5G/6G cellular, among others. Such communication may occur, for example, through the transceiver 668 using a radio frequency. In addition, short-range communication may occur, such as using a Bluetooth, Wi-Fi, or other such transceiver (not shown). In addition, a GPS (Global Positioning System) receiver module 670 may provide additional navigation- and location-related wireless data to the computing device 650, which may be used as appropriate by applications running on the computing device 650.

The computing device 650 may also communicate audibly using an audio codec 660, which may receive spoken information from a user and convert it to usable digital information. The audio codec 660 may likewise generate audible sound for a user, such as through a speaker, e.g., in a handset of the computing device 650. Such sound may include sound from voice telephone calls, may include recorded sound (e.g., voice messages, music files, among others) and may also include sound generated by applications operating on the computing device 650.

The computing device 650 may be implemented in a number of different forms, as shown in the figure. For example, it may be implemented as a type of scope 680. The scope 680 may include various processors or electrical components as described herein.

FIG. 7 is a flowchart illustrating an example of a process 700 for providing an enhanced PIP view. The process 700 may be performed by one or more electronic systems, for example, the system 100 of FIG. 1, the system 200 of FIG. 1, or the device 500.

The process 700 includes generating a first magnified image from a first region of a wide FOV image including a center of a reticle (702). For example, as shown in FIG. 1, the scope 105 can generate the magnified PIP view 131. A view engine of the scope 105, similar to the view engine 515 or the view engine 204, may generate the magnified PIP view 131 for display. As described in FIG. 2, the view engine can generate a view based on the light directed by a lens assembly, such as the lens assembly 202.

The process 700 includes initiating display of the first magnified image overlapping a first portion of the wide FOV image (704). For example, upon receiving user input or automatically upon startup, the scope 105 can display the magnified PIP view 131. The magnified PIP view 131 can include a reticle indicating a point of aim. The magnified PIP view 131 can be copied from a first region of the wide FOV image 121. The first region can include a center of the reticle 122.

The process 700 includes receiving an indication to adjust the first magnified image (706). For example, the scope 105 can receive manual or automatically generated input configured to adjust the PIP view 152. For example, the scope 105 can include a manual user-accessible control (e.g., a multi-function switch, touch screen selection, external application on a mobile computing device, etc.) and/or some other method/control consistent with this application. The scope 105 can adjust the PIP view 152 based on control input provided by a user.

In some implementations, the scope 105 automatically re-centers the PIP view 152 on the estimated POI 113. For example, in implementations where the scope 105 can perform a POI calculation, the scope 105 can automatically re-center the PIP view 152 on a region of the wide FOV inmate 121 that includes a graphical POI indicator. The scope 105 can immediately re-center the PIP view 152 following such calculations or request a user input to confirm re-centering the PIP before doing so.

The process 700 includes generating a second magnified image from a second region of the wide FOV image offset from the center of the reticle (708). For example, in response to receiving manual or automatically generated input configured to adjust the PIP view 152, the scope 105 can shift a region of the wide FOV image 121 down and to the left (e.g., as shown in FIG. 1) in order to magnify a region of the wide FOV image 121 that is offset from the center of the reticle 122a, but which encompasses the estimated POI 113 on the magnified target 124b shown in the PIP view 152.

The process 700 includes initiating display of the second magnified image replacing the first image and overlapping a second portion of the wide FOV image (710). For example, the scope 105 can generate the view 150 that includes a graphical representation of the estimated POI 131 and the PIP view 152 centered on the estimated POI 131. The PIP view 152 is arranged overtop a portion of the wide FOV image 121 in view 150. The scope 105 can provide a digital representation of the view 150 to a holographic engine for holographic display or another display device (e.g., LCD, LED display, among others). Either holographic display or other display device can be mounted within the scope 105 and visible through an eyepiece of the scope 105.

In some implementations, more than one PIP view is displayed concurrently. For example, a first PIP view can include a magnified portion centered on a first location within a wide FOV. A second PIP view can include a magnified portion centered on a second location within the wide FOV. The scope 105 can generate both the first PIP view and the second PIP view and include them in a view for display. In some cases, the first location and the second location can be the same location. For example, the second PIP view can be centered on a same, or different, location as the first PIP view and display different data (e.g., infrared, night vision, among others), a different magnification level, or a different PIP ratio or arrangement (e.g., a vertical view, horizontal view, among others including PIP views similar to those shown in FIG. 3).

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims can be performed in a different order and still achieve desirable results.

The invention claimed is:

1. A method comprising:
    generating a first magnified image from a wide field-of-view (FOV) image comprising a reticle indicating a point of aim, wherein the first magnified image is copied from a first region of the wide FOV image, the first region comprising a center of the reticle;
    initiating display of the first magnified image within an eye piece of an optical device, the magnified image overlapping a first portion of the wide FOV image within the eye piece;
    receiving an indication to adjust the first magnified image;
    generating a second magnified image, wherein the second magnified image is copied from a second region of the wide FOV image, the second region being offset from the center of the reticle; and
    initiating display of the second magnified image within the eye piece, the second magnified image replacing the first image and overlapping a second portion of the wide FOV image within the eye piece.

2. The method of claim 1, further comprising:
    determining, based on data from one or more sensors, an estimated point of impact within the wide FOV image, wherein the estimated point of impact is located within the second region of the wide FOV image.

3. The method of claim 2, further comprising:
    adjusting a location of the reticle to center the reticle on the estimated point of impact within the wide FOV image; and
    initiating display of the reticle at the location within the eye piece.

4. The method of claim 2, wherein the one or more sensors comprise at least one of a thermometer, altimeter, hygrometer, barometer, inclinometer, gyroscope, accelerometer, light sensor, or compass.

5. The method of claim 2, wherein the second region of the wide FOV image is centered on the estimated point of impact.

6. The method of claim 2, further comprising:
    initiating display of a graphical indicator within the eye piece, the graphical indicator positioned at the estimated point of impact within the wide FOV image.

7. The method of claim 2, wherein the indication comprises a user input indicating to center the first magnified image on the estimated point of impact.

8. The method of claim 1, wherein the indication comprises a user input defining a direction within the wide FOV image to pan the first magnified image.

9. The method of claim 1, wherein the second portion of the wide FOV image is the same as the first portion of the wide FOV image.

10. The method of claim 1, wherein the first portion is above the reticle.

11. The method of claim 1, wherein the first portion is to one side of the reticle.

12. A firearm scope comprising:
    a digital display;
    at least one hardware processor communicably coupled to the digital display; and
    computer memory interoperably coupled to the at least one hardware processor and storing instructions that, when executed by the at least one hardware processor, cause the at least one hardware processor to perform operations comprising:
        generating, from a received image, a wide field-of-view (FOV) image comprising a reticle indicating a point of aim;
        initiating display of the wide FOV image on the digital display;
        generating a first magnified image, wherein the first magnified image is copied from a first region of the wide FOV image, the first region comprising a center of the reticle;
        initiating display of the first magnified image on the display simultaneously with the wide FOV image, the magnified image overlapping a first portion of the wide FOV image;
        receiving an indication to adjust the first magnified image;
        generating a second magnified image, wherein the second magnified image is copied from a second region of the wide FOV image, the second region being offset from the center of the reticle; and
        initiating display of the second magnified image on the display simultaneously with the wide FOV image, the second magnified image replacing the first image and overlapping a second portion of the wide FOV image.

13. The firearm scope of claim 12, wherein the operations further comprise:
    determining, based on data from one or more sensors, an estimated point of impact within the wide FOV image, wherein the estimated point of impact is located within the second region of the wide FOV image.

14. The firearm scope of claim 13, wherein the second region of the wide FOV image is centered on the estimated point of impact.

15. The firearm scope of claim 13, wherein the operations further comprise:
    initiating display of a graphical indicator within the eye piece, the graphical indicator positioned at the estimated point of impact within the wide FOV image.

16. The firearm scope of claim 13, wherein the indication comprises a user input indicating to center the first magnified image on the estimated point of impact.

17. The firearm scope of claim 12, wherein the firearm scope further comprises one or more sensors including one or more of a thermometer, altimeter, hygrometer, barometer, inclinometer, gyroscope, accelerometer, light sensor, and compass, and wherein the operations further comprise:
    determining, based on data from the one or more sensors, an estimated point of impact within the wide FOV image, wherein the estimated point of impact is located within the second region of the wide FOV image.

18. The firearm scope of claim 12, wherein the indication comprises a user input defining a direction within the wide FOV image to pan the first magnified image.

19. A firearm scope comprising:

a digital display;

at least one hardware processor communicably coupled to the digital display; and computer memory interoperably coupled to the at least one hardware processor and storing instructions that, when executed by the at least one hardware processor, cause the at least one hardware processor to perform operations comprising:

generating, from a received image, a wide field-of-view (FOV) image comprising a reticle indicating a point of aim and a target in an environment;

initiating display of the wide FOV image on the digital display;

22 obtaining sensor input corresponding to conditions of the target and the environment;

determining, based on the sensor input, a point of impact;

generating a magnified image, wherein the magnified image is copied from a region of the wide FOV image, the region being offset from the center of the reticle and centered on the determined point of impact; and initiating display of the magnified image on the digital display simultaneously with the wide FOV image, the magnified image overlapping a portion of the wide FOV image.

20. The firearm scope of claim 19, wherein the operations further comprise:

adjusting the magnified image.

* * * * *